(12) United States Patent
Keil et al.

(10) Patent No.: US 9,682,829 B2
(45) Date of Patent: Jun. 20, 2017

(54) METHOD AND TRANSPORT DEVICE FOR CONVERTING A FIRST CONTAINER STREAM INTO A SECOND CONTAINER STREAM

(71) Applicant: KHS GmbH, Dortmund (DE)

(72) Inventors: Gernot Keil, Braunweiler (DE); Carsten Hahn, Münster (DE); Petra Scholz, Dortmund (DE); Klaus Krämer, Dortmund (DE); Christopher Stuhlmann, Korbach (DE); Thomas Stienen, Unna (DE); Rene Bastian Lippert, Kleve (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 14/906,041

(22) PCT Filed: Jul. 3, 2014

(86) PCT No.: PCT/EP2014/064140
§ 371 (c)(1),
(2) Date: Jan. 19, 2016

(87) PCT Pub. No.: WO2015/007529
PCT Pub. Date: Jan. 22, 2015

(65) Prior Publication Data
US 2016/0159583 A1 Jun. 9, 2016

(30) Foreign Application Priority Data

Jul. 16, 2013 (DE) .................. 10 2013 107 565

(51) Int. Cl.
*B65G 47/26* (2006.01)
*B65G 47/71* (2006.01)
(Continued)

(52) U.S. Cl.
CPC .......... *B65G 47/715* (2013.01); *B65G 47/71* (2013.01); *B65G 47/842* (2013.01); *B65G 54/02* (2013.01); *B65G 2201/0247* (2013.01)

(58) Field of Classification Search
CPC ...... B65G 54/02; B65G 47/71; B65G 47/848; B65G 47/715; B65G 47/842
(Continued)

(56) References Cited

U.S. PATENT DOCUMENTS 1,719,897 A 7/1929 Mayo
4,457,420 A * 7/1984 Ducloux ................. B07C 5/122
198/370.07

(Continued)

FOREIGN PATENT DOCUMENTS

DE 35 05 236 8/1985
DE 41 34 735 4/1993
(Continued)

*Primary Examiner* — James R Bidwell
(74) *Attorney, Agent, or Firm* — Occhiuti & Rohlicek LLP

(57) ABSTRACT

A method for converting a first container stream into a second container stream that has a different width from said first container stream includes moving a container from the first container stream to a first transfer position, at the first transfer position, using a container holder of a conversion section to grip the container, to move it along a third transport direction until it arrives at a selected one of a several second transfer positions, and to then release it onto the second transport section, thereby enabling the container to join the second container stream. The second transfer positions are offset relative to each other in a direction along the second width.

20 Claims, 5 Drawing Sheets

(51) Int. Cl.
*B65G 47/86* (2006.01)
*B65G 54/02* (2006.01)

(58) Field of Classification Search
USPC .................. 198/436, 438, 456, 428, 440
See application file for complete search history.

(56) References Cited

U.S. PATENT DOCUMENTS

| | | | | |
|---|---|---|---|---|
| 4,467,908 | A | * | 8/1984 | Schneider .............. B65G 47/71 198/441 |
| 4,760,909 | A | * | 8/1988 | Dudley ................... B07C 5/122 198/370.12 |
| 5,048,818 | A | * | 9/1991 | Nemeskal .............. B65H 29/58 198/438 |
| 5,135,101 | A | * | 8/1992 | Dudley ................ B65G 47/525 198/370.07 |
| 5,423,410 | A | * | 6/1995 | Keller ................. B65G 47/252 198/406 |
| 2004/0163930 | A1 | * | 8/2004 | Work ..................... B23Q 7/001 198/456 |

FOREIGN PATENT DOCUMENTS

| | | |
|---|---|---|
| DE | 43 43 477 | 8/1995 |
| DE | 10 2006 025090 | 8/2007 |
| EP | 1 123 884 | 8/2001 |

\* cited by examiner

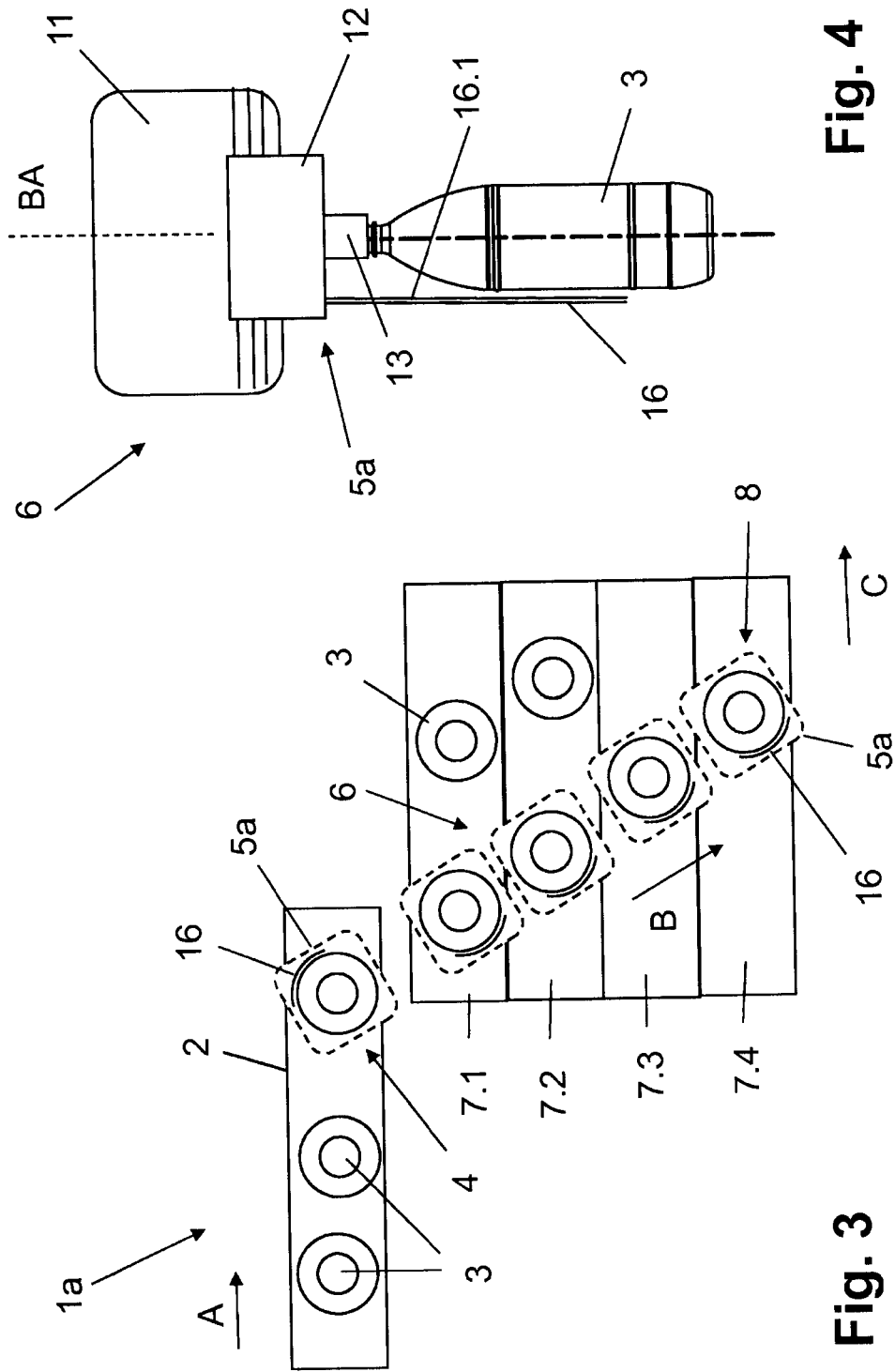

METHOD AND TRANSPORT DEVICE FOR CONVERTING A FIRST CONTAINER STREAM INTO A SECOND CONTAINER STREAM

RELATED APPLICATIONS

This is the national stage under 35 USC 371 of international application PCT/EP2014/064140, filed on Jul. 3, 2014, which claims the benefit of the Jul. 16, 2013 priority date of German application DE 102013107565.7, the contents of which are herein incorporated by reference.

FIELD OF INVENTION

The invention relates to transporting containers, and in particular, to converting a single-lane track of containers into a multi-lane track of containers.

BACKGROUND

A common sight in any supermarket is a cluster of containers that have been grouped together in some way for sale. For example, one often sees large shrink-wrapped packages in which many single-serving containers have been grouped together to be sold as a unit. These container clusters are often more convenient for a consumer who wishes to buy many drinks at one time. In addition, the cost per container for a consumer is often lower when buying by the product cluster.

To make these container clusters, it is first necessary to arrange containers so that they are in the correct spatial relationship relative to each other. For example, if one wishes to form a container cluster arranged in an array of columns and rows, some way must be found to arrange the containers in such an array in the first place.

In many cases, a conveyor belt conveys a single stream of containers. To form the rows of such an array, it is necessary to divide this single stream into multiple streams, each of which forms a row. Doing this often results in having to change the bottle's velocity vector in some way. A change of velocity is, of course, acceleration. Since force and acceleration are related, this acceleration introduces a force that may topple the bottles.

SUMMARY

An object of the invention is to reliably convert a first container stream into a second container stream that has more parallel container tracks than the first container stream. This, of course, means that the second container stream must be wider than the first.

In many applications, the first container stream comes from a labeling machine and the second container stream is on its way to a further container-processing machine, such as a packaging machine. In some cases, the multi-track container stream arrives at a packaging machine immediately after having been formed. In fact, in some embodiments, the multi-track container stream is actually formed in the area of lane formation or lane division of a packing machine.

In one aspect, a transport device includes a conversion section that comprises a container carrier or container holder that can be moved in a controlled manner along a transport direction of the conversion section between a first transfer position on a first transport section and a second transfer position on a section transport section. The container carrier or container holder thus receives a container at the first transfer position, carries it, and deposits it at a second transfer position on the second transport section. In those cases in which the second transport section has multiple tracks, the transfer of the containers takes place in a controlled manner at a second transfer position allocated to each track. In some embodiments, the conversion section has multiple container holders of this type that are movable independently of each other.

To allow the conversion section to work continuously and quickly, the container holder moves around a closed path of the conversion section. A part of this path used for the conversion between the two transport sections extends between a first transfer position on the first transport section and a second transfer positions on the second transport section. If the second transport section has multiple tracks, each such track will have its own second transfer position.

In some embodiments, the container holder includes a container carrier and/or a container gripper to grip or grasp the container at the first transfer position. This container gripper carries the container along, and releases it to carry out the transfer to the second transport section.

Conveyor belts form the transport sections and/or their tracks. In some embodiments, these conveyor belts are hinged belt chains on which the containers are disposed upright on their bases and with their container axes oriented vertically or substantially vertically. In other embodiments, the conveyor belts suspend containers. This is particularly useful for containers or bottles made of plastic, such as PET.

In some embodiments, the container carrier element and/or the container gripper of the container holder is provided on a support that is guided such that it can move or shift on a stator of the conversion section. This support interacts with the stator to forms an armature of an electric linear drive or electric linear motor. Such a linear motor has permanent magnets with alternating polarities arranged along the movement path of the container holder. In these embodiments, the support of the container holder includes a magnetic coil that interacts with the permanent magnets. In other known embodiments of linear motors, permanent magnets and magnetic coils can be transposed.

In a further embodiment, the second transport section is a multi-track transport section having multiple tracks, each of which forms a row of containers. The first transport section carries a container stream in which the number of rows of containers or tracks is smaller than the number of container rows or tracks of the second transport section. In some embodiments, the first transport section carries a single-track container stream and the second transport section carries a multi-track container stream.

In some embodiments, a conveying section between the two transport sections moves containers along a transport direction that has components parallel to and perpendicular to the directions in which the two transport sections transport containers.

In some embodiments, the first, second, and third transport directions along which containers are conveyed are horizontal or substantially horizontal transport directions.

In other embodiments, a container holder moves on a closed movement path on the conversion section or on a stator of the conversion section. A portion of this movement path extends between the first transfer position and the second transfer positions. The conversion section has at least two, and preferably more than two container holders. Each container holder can be controlled individually and independently of the other container holders.

In yet other embodiments, a support guided on a stator of the conversion section forms a container holder, a container carrier, or a container gripper.

In still other embodiments, the support is an armature of an electric linear drive.

Further embodiments include those in which the container holder has a container support element that forms a domed supporting surface for the circumferential or jacket surface of the container.

Yet other embodiments feature a container support element that can be swiveled in a controlled manner about a vertical or substantially vertical axis.

Also among the embodiments are those in which the container holder carries out controlled lateral movement of the container gripper when the container is passed onto the second transfer position.

In other embodiments, the container holder has an arm having the container gripper at an end thereof. The arm can be swiveled about an axis or moved on the support of the container holder.

In yet other embodiments, the second transport section relative to an axial direction is disposed perpendicular to the first and/or second transport direction laterally relative to the first transport section.

Further embodiments include combinations of any of the foregoing features.

In one aspect, the invention features a method for converting a first container stream into a second container stream that has a different width from said first container stream. The first and second container streams convey containers in different first and second transport directions. The method includes moving a container from the first container stream to a first transfer position, at the first transfer position, using a container holder of a conversion section to grip the container, to move it along a third transport direction until it arrives at a selected one of a several second transfer positions, and to then release it onto the second transport section, thereby enabling the container to join the second container stream. The second transfer positions are offset relative to each other in a direction along the second width.

In some practices, the second container stream includes a plurality of tracks. In these practices, releasing the container includes setting the container down on a selected track in a controlled manner.

Other practices include using additional container holders to convey additional containers from the first transfer position to a selected one of the second transfer positions.

In another aspect, the invention features a transport device including a first transport section, a second transport section, and a conversion section, wherein the first transport section includes a first transfer position, wherein the conversion section includes second transfer positions, a container holder, and a container gripper. The first transport section conveys a first container stream along a first transport direction, while the second transport section conveys a second container stream along a second transport direction. These two container streams have different widths. The conversion section, which is disposed between the first and second transport sections, passes containers at the first transport section in a controlled manner to any one of the second transfer positions distributed along a third transport direction that extends along the conversion section. The container holder is movable in a controlled manner along the third transport direction between the first transfer position and any one of the second transfer positions. The gripper is configured to grip a container at the first transfer position and to carry the container along the third transport direction to any one of the second transfer positions.

In some embodiments, the second transport section is a multi-track transport section including a plurality of tracks, each of which defines a container row.

In other embodiments, the first transport section conveys a container stream having fewer tracks than the container stream conveyed by the second transport section. Among these are embodiments in which the first transport section conveys a single-track container stream, and the second transport section is conveys a multi-track container stream.

In some embodiments, the container holder moves along a velocity vector having a component directed along the first transport direction and a component directed along the second transport direction.

In other embodiments, the first, second and third transport directions are horizontal transport directions.

In yet other embodiments, the container holder is movable along a closed movement path on the conversion section. A portion of this closed movement path extends between the first and second transfer positions.

Additional embodiments are those in which the conversion section includes a plurality of container holders, each of which is controllable to move independently of all other container holders.

Other embodiments include including an electric linear motor having a stator. In these embodiments, container holder includes a support guided on the stator, and the container gripper is coupled to the support. Among these embodiments are those in which the electric linear motor further includes an armature, with the support being a constituent part thereof. Also among these embodiments are those in which the container holder includes an arm with the container gripper at an end of thereof. In these embodiments, the arm translates relative to the support.

In yet other embodiments, the container holder includes a container support that defines a container-support surface for supporting a container surface of the container. In these embodiments, the container-support surface is part of a cylinder. In particular, it is that subset of a cylinder consisting of all points on the cylinder that have an angular coordinate between first a first angular coordinate and a second angular coordinate that differs from the first angular coordinate. In these embodiments, the container support swivels about an axis of the container.

In other embodiments, the container holder permits controlled sideways movement of the container gripper when the container is set down at the second transfer position.

Also among the embodiments are those in which the container holder includes an arm, wherein the container gripper is at an end of the arm, and wherein the arm is configured to swivel.

As used herein, a "container gripper" is a functional element that grasps, holds, and/or carries containers.

As used herein, expressions such as "substantially" or "approximately" mean deviations from exact values by ±10%, and preferably by ±5%, and/or deviations in the form of changes not significant for function.

Further developments, benefits, and application possibilities of the invention arise also from the following description of examples of embodiments and from the figures. Moreover, all characteristics described and/or illustrated individually or in any combination are categorically the subject of the invention, regardless of their inclusion in the claims or reference to them. The content of the claims is also an integral part of the description.

BRIEF DESCRIPTION OF THE DRAWINGS

The invention is explained in more detail below by means of the figures using examples of embodiments. The following are shown:

FIG. 3 shows a more detailed view of the conversion section of FIG. 2;

FIG. 4 shows one of the container holders of the conversion section in FIG. 3;

DETAILED DESCRIPTION

Figure 1:
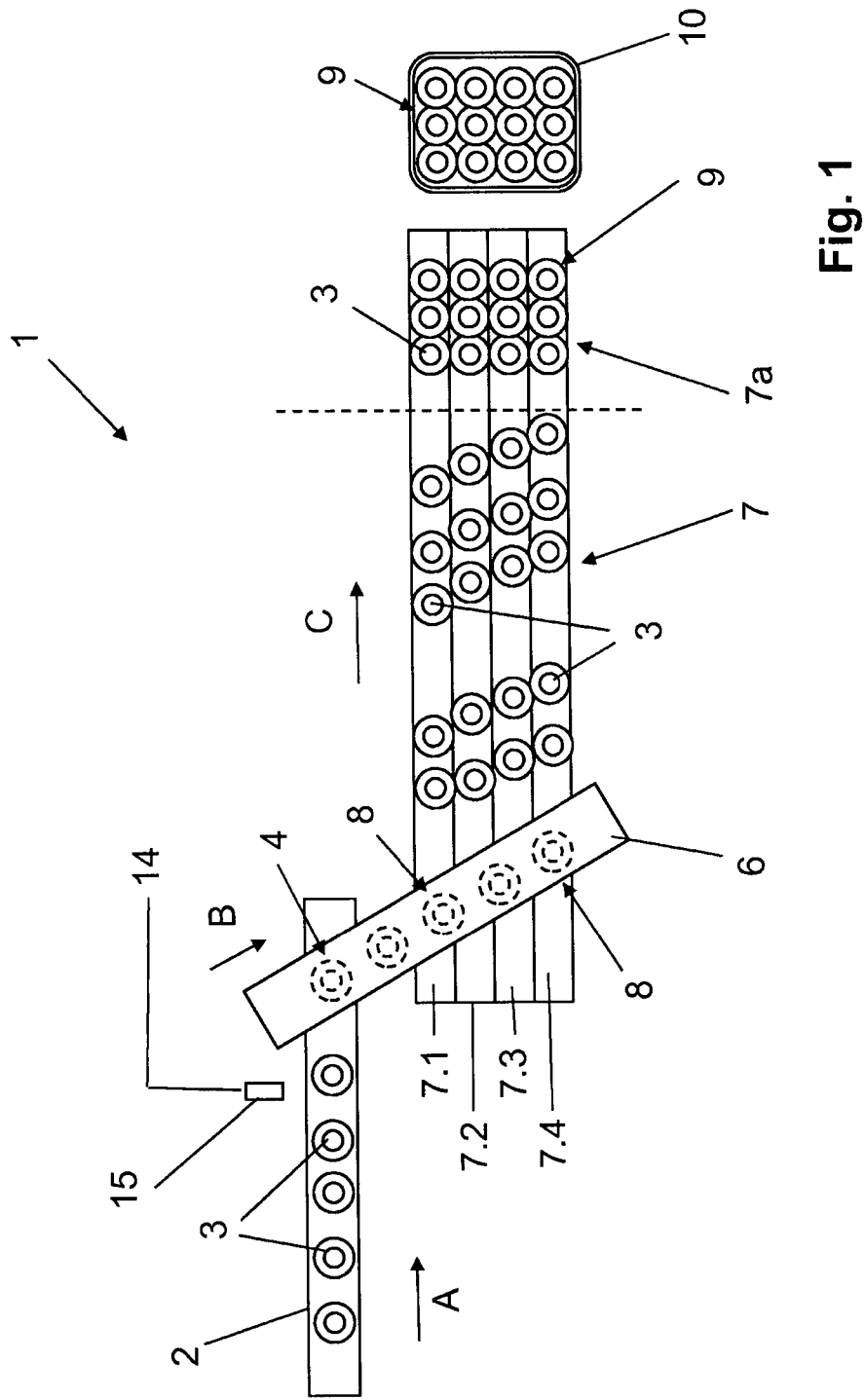
FIG. 1 shows a plan view of a transport device for converting a narrow single-track container stream into a wider multi-track container stream.

FIG. 1 shows a first transport device 1 for converting a single-track container stream into a multi-track container stream. Throughout the transport procedure, the containers rest on their bases with their axes oriented vertically.

The first transport device 1 includes a single-track transport section 2 that conveys a container 3 along a first transport direction A from a container-processing machine, such as a labeling machine. At the end of the first transport section 2, the container reaches a first transfer position 4 so that it can be transferred to a conversion section 6. Once the container 3 reaches the first transfer position 4, a waiting container holder 5, best seen in FIG. 2, grasps it.

The container holder 5 conveys the container 3 along a conversion section 6 that extends along a second transport direction B that is oriented diagonally relative to the first transport direction A. The container holder 5 brings the container to one of several second transfer positions 8 at a wider multi-track transport-section 7 located to the side of the single-track transport section 2.

In some embodiment, the conveyor belts that form the multi-track transport section 7 have a surfaces with a very low friction coefficient. In other embodiments, these conveyor belts have been sprayed with a friction-reducing agent.

The second transfer position 8 is one of several second transfer positions that are offset from each other in the second transport direction B. Although the third transport direction C is shown as being parallel to the first transport direction A, this is not required.

In the illustrated embodiment, the multi-track transport-section 7 has multiple tracks 7.1-7.4, each one of which conveys a lane of containers 3 along the third transport direction C. This results in a multi-track container stream. Each track 7.1-7.4 corresponds to one of the second transfer positions 8.

On a downstream section 7a of the multi-track transport-section 7 in FIG. 1, containers being conveyed by the multi-track transport-section 7 are divided and organized to form container groups 9, each of which has rows and columns of containers. The rows of the container group 9 extend along the third transport direction C; its columns extend in a direction perpendicular to its rows. The number of rows in a container group 9 is equal to the number of tracks 7.1-7.4. In the particular embodiment shown, there are three columns of containers 3 per container group 9. A multiple gripper of a packing machine then inserts the groups of containers into corresponding container crates 10 to form packaging units or cluster packs.

Referring now to FIG. 4, each container holder 5 includes a first support 12 and a container gripper 13 coupled to the first support 12. Each container gripper 13 grips a container 3 near its closed mouth.

Each first support 12 is an armature of an electric linear motor having a stator 11 that lies above the horizontal transport level of both the single-track transport-section 2 and the multi-track transport-section 7. A controller 14, shown in FIG. 1, individually controls the motion of these armatures, or first supports 12, as well as operation of the conversion section 6, the container holders 5, and the multi-track transport-section 7.

In a typical embodiment, the controller 14 is a process computer of a plant that comprises the first transport device 1. The controller 14 relies in part on control signals that it receives from one or more sensors 15 provided on the single-track transport section 2, the multi-track transport section 7 and on the conversion section 6.

The container holders 5 are guided along the stator 11 on a horizontal or substantially horizontal section of a closed-circuit movement path 6.1 that extends along the second transport direction B from the single-track transport-section 2, across all four lanes 7.1-7.4 of the multi-track transport-section 7, and back again. A particular container holder 5 moves from the first transfer position 4 along the second transport direction B until it reaches the last lane 7.4. At this point, the container holder 5 turns around and moves in a direction opposite the second transport direction B until it returns to the first transfer position 4 at the single-track transport-section 2.

Because the container holders 5 are armatures of the electric linear motor, the controller 14 can move them individually in a controlled manner the movement path 6.1 between the single-track transport-section 2 and the tracks 7.1-7.4 of the multi-track transport section 7. The controller 14 controls movement of these container holders 5 in such a way that there is always a container holder 5 at the first transfer position 4 ready to receive a container 3 before the single-track transport-section 2 brings a container to the first transfer position 4.

In some embodiments, the controller 14 also controls the conveying speed of the individual tracks 7.1-7.4 and does so individually on a track-by-track basis. However, this is not necessary. On the other hand, embodiments that lack this capability offer fewer options for supplying a complete container group 9 to a subsequent packing machine.

In operation, the single-track transport section 2 brings a container to the first transfer position 4. A container holder 5 that has been waiting there grasps it and moves it along the second transport direction B to one of the second transfer positions 8, where it is placed on one of the tracks 7.1-7.4.

The controller 14 causes the conversion section 6 to transfer, to each one of the tracks 7.1-7.4, as many containers 3 as there are containers 3 in a corresponding row of the container group 9. Thus, in each multi-phased working cycle, the controller 14 provides all of the tracks 7.1-7.4 one after the other with the required number of containers 3. If the necessary number of containers 3 reaches a track 7.1-7.4, the controller 14 reduces the transport speed of that track of that track to a transport speed that corresponds to the working speed of a container-processing machine that follows the multi-track transport-section 7.

Because the controller 14 can control each container holder 5 on an individual basis, it is guaranteed that even if containers are not spaced uniformly on the single-track transport-section 2, there will always be an unoccupied container holder 5 is ready at the transfer position when a container 3 reaches this position.

Figure 2:
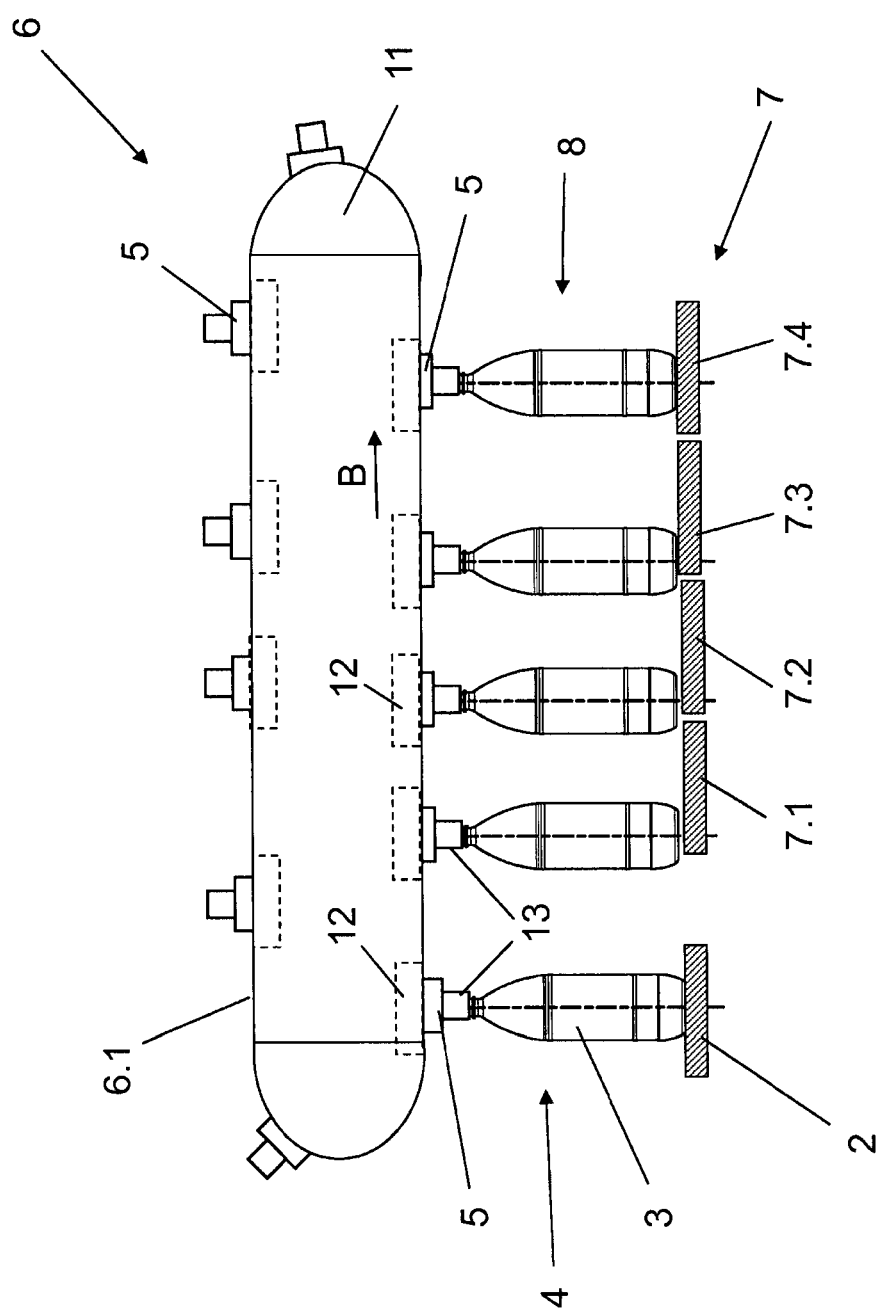
FIG. 2 shows a conversion section of the transport device in FIG. 1.

For the illustration in FIGS. 1 and 2, it was assumed that the containers stand upright with their container base on the single-track transport-section 2 and the multi-track transport section 7 or on the conveyor belts forming these transport sections. However, in other embodiments, the containers are instead suspended.

In the embodiments described thus far, the container holders 5 on the stator 11 move on a closed movement path 6.1, that is disposed in a vertical plane. However, in other embodiments, the closed movement path 6.1 can be oriented differently. One such orientation includes disposing the movement path 6.1 on a horizontal plane.

FIG. 3 shows a second transport device 1a that differs from the first transport device 1 by having a container holder 5a and a second support 16. As can best be seen in FIG. 4, the second support 16 extends downward from the first support 12 to form a container support surface 16.1. As indicated by FIG. 3, this container support surface 16.1 lies along an arc of a circle that is centered on a vertical container axis BA and that has a radius slightly larger than the radius of the container 3. The second support 16 thus surrounds a portion of a container's circumference.

In FIG. 3, one can see that the second support 16 at the transfer position b is located at a different location from the second supports b that are over the lanes 7.1-7.4. This is possible because the second support 16 swivels about the container axis BA. As a result, the second support 16 can swivel out of the way to avoid impeding transfer of a container 3 at the first transfer position 4, as shown in FIG. 3. But once the container has been received and transferred onto the container holder 5a, the second support 16 swivels around to a new position that enables it to support the container 3 as the container attempts to move in response to inertial forces that arise when the container's velocity vector changes direction from the first transport direction A to the second transport direction B, and again from the second transport direction B to the third transport direction C.

Figure 5:
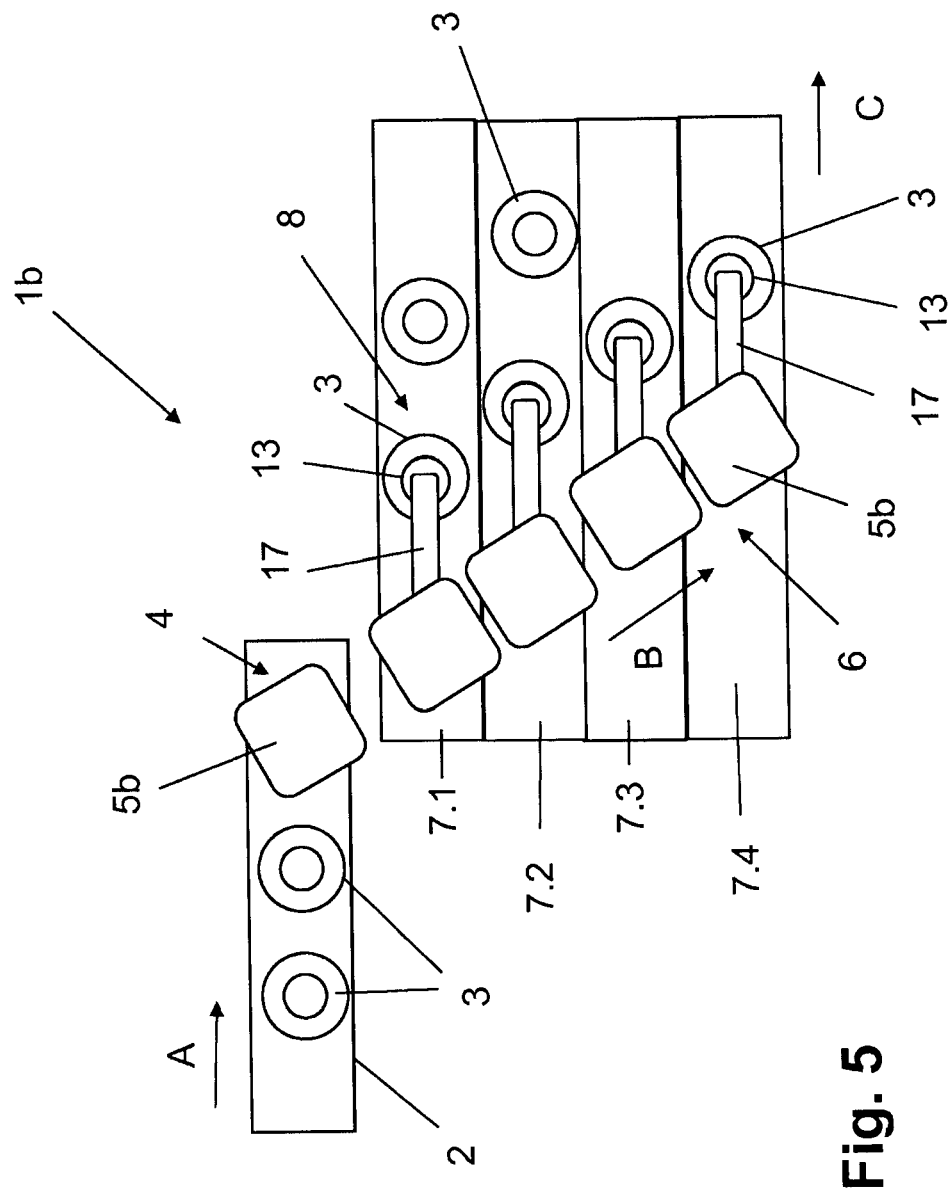
FIG. 5 shows an alternative conversion section.
Figure 6:
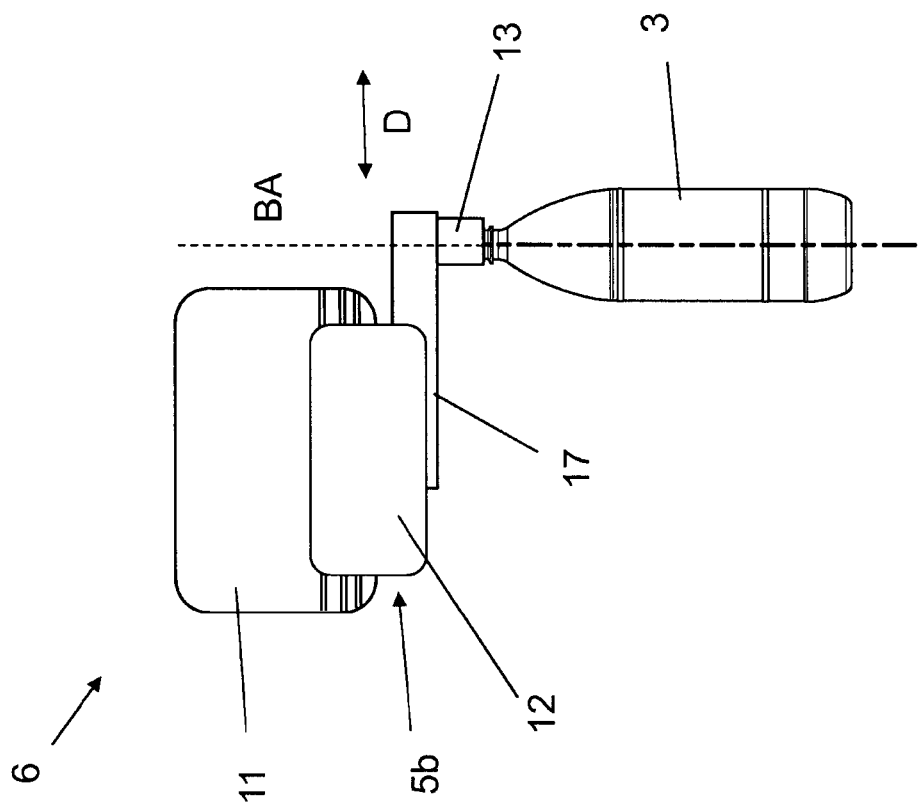
FIG. 6 shows an alternative container holder corresponding to the conversion section in FIG. 5.

FIGS. 5 and 6 show a third transport device 1b that differs from the first transport device 1 by having container holders 5b that permit translation of the container gripper 13 along the third transport direction C in a direction away from the first support 12. To achieve this, the first support 12 of each container holder 5b includes an arm 17 with the container gripper 13 being at the end of the arm 17.

An advantage of the third transport device 1b is that instead of simply dropping the containers 3 on the multi-track transport section 7 directly from the conversion section 6, it becomes possible to use the arm 17 to accelerate the containers 3 so that their velocity closely matches that of the relevant track 7.1-7.4 on which it is to be placed. This provides a smoother drop-off that avoids subjecting a container 3 to inertial forces resulting from a sudden change in its velocity.

This lateral offset of the containers 3 in order to deposit them on the multi-track transport-section 7 can be implemented in other equivalent ways. For example, in some embodiments, the controller 14 swivels or rotates the arm 17 in a controlled manner to achieve a substantially similar result.

Since the supports 12 are individually controllable in their movement, it becomes possible for them to move with variable speed along the second transport direction B. In some embodiments, it is particularly advantageous for a support 12 to pause momentarily as it drops of its container 3 onto the multi-track transport-section 7. Doing so avoids unnecessary inertial forces on the container 3 that arise from dropping it on a surface moving in the third transport direction C while it still has a component of velocity in the second transport direction B.

In general, the controller 14 operates the third transport device 1b in such a way that the vector difference between a first vector directed in the third transport direction C and a second vector directed along the second transport direction B has a magnitude that is as small as possible at the moment that the container 3 is released onto the multi-track transport-section 7.

The invention was described above using examples of embodiments. It is clear that numerous modifications and variations are possible without thereby departing from the inventive idea supporting the invention.

The invention claimed is:

1. An apparatus for transporting containers, said apparatus comprising a transport device, said transport device comprising a first transport section, a second transport section, and a conversion section, wherein said first transport section comprises a first transfer position, wherein said conversion section comprises a plurality of second transfer positions, a container holder, and a container gripper, wherein said first transport section conveys a first container stream along a first transport direction, said first container stream having a first width, wherein said second transport section conveys a second container stream along a second transport direction, said second container stream having a second width that differs from said first width, wherein said conversion section is disposed between said first and second transport sections, wherein said conversion section is configured to pass containers at said first transport section in a controlled manner to any one of said second transfer positions, wherein said second transfer positions are distributed along a third transport direction that extends along said conversion section, wherein said container holder is movable in a controlled manner along said third transport direction between said first transfer position and any one of said second transfer positions, wherein said gripper is configured to grip a container at said first transfer position and to carry said container along said third transport direction to any one of said second transfer positions, wherein said container holder comprises an arm, wherein said container gripper is at an end of said arm, and wherein said arm is configured to swivel.

2. The apparatus of claim 1, wherein said second transport section is a multi-track transport section comprising a plurality of tracks, each of said tracks defining a container row.

3. The apparatus of claim 1, wherein said first transport section conveys a container stream having a first number of container tracks, wherein said second transport section comprises a second number of container tracks, wherein said second number is greater than said first number.

4. The apparatus of claim 3, wherein said first transport section is configured to convey a single-track container stream, and wherein said second transport section is configured to convey a multi-track container stream.

5. The apparatus of claim 1, wherein said container holder is configured to move along a velocity vector having a component directed along said first transport direction and a component directed along said second transport direction.

6. The apparatus of claim 1, wherein said first, second and third transport directions are horizontal transport directions.

7. The apparatus of claim 1, wherein said container holder is movable along a closed movement path on said conversion section, wherein said closed movement path comprises a portion that extends between said first transfer position and a second transfer position.

8. The apparatus of claim 1, wherein said container holder is configured to permit controlled sideways movement of said container gripper when said container is set down at said second transfer position.

9. An apparatus for transporting containers, said apparatus comprising a transport device, said transport device comprising a first transport section, a second transport section, and a conversion section, wherein said first transport section comprises a first transfer position, wherein said conversion section comprises a plurality of second transfer positions, a container holder, and a container gripper, wherein said first transport section conveys a first container stream along a first transport direction, said first container stream having a first width, wherein said second transport section conveys a second container stream along a second transport direction, said second container stream, said second container stream having a second width that differs from said first width, wherein said conversion section is disposed between said first and second transport sections, wherein said conversion section is configured to pass containers at said first transport section in a controlled manner to any one of said second transfer positions, wherein said second transfer positions are distributed along a third transport direction that extends along said conversion section, wherein said container holder is movable in a controlled manner along said third transport direction between said first transfer position and any one of said second transfer positions, wherein said gripper is configured to grip a container at said first transfer position and to carry said container along said third transport direction to any one of said second transfer positions, and wherein said conversion section comprises a plurality of container holders, each of which is controllable to move independently of all other container holders.

10. The apparatus of claim 9, wherein said container holder comprises a swivel arm having said container gripper at an end thereof.

11. The apparatus of claim 9, wherein said second transport section is a multi-track transport section in which each track defines a row of containers.

12. An apparatus for transporting containers, said apparatus comprising a transport device, said transport device comprising a first transport section, a second transport section, and a conversion section, wherein said first transport section comprises a first transfer position, wherein said conversion section comprises a plurality of second transfer positions, a container holder, and a container gripper, wherein said first transport section conveys a first container stream alone a first transport direction, said first container stream having a first width, wherein said second transport section conveys a second container stream along a second transport direction, said second container stream, said second container stream having a second width that differs from said first width, wherein said conversion section is disposed between said first and second transport sections, wherein said conversion section is configured to pass containers at said first transport section in a controlled manner to any one of said second transfer positions, wherein said second transfer positions are distributed, along a third transport direction that extends along said conversion section, wherein said container holder is movable in a controlled manner along said third transport direction between said first transfer position and any one of said second transfer positions, and wherein said gripper is configured to grip a container at said first transfer position and to carry said container along said third transport direction to any one of said second transfer positions, said apparatus further comprising an electric linear motor, wherein said electric linear motor comprises a stator, wherein said container holder comprises a support guided on said stator, and wherein said container gripper is coupled to said support.

13. The apparatus of claim 12, wherein said electric linear motor further comprises an armature, wherein said armature comprises said support.

14. The apparatus of claim 12, wherein said container holder comprises an arm, wherein said container gripper is at an end of said arm, and wherein said arm is configured to translate relative to said support.

15. The apparatus of claim 12, further comprising an arm configured to swivel, said arm containing a constituent of said container holder and having said container gripper at an end thereof.

16. The apparatus of claim 12, wherein said second transport section conveys more container tracks than said first transport section.

17. The apparatus of claim 12, wherein said container holder is configured to permit controlled sideways movement of said container gripper when said container is set down at said second transfer position.

18. An apparatus for transporting containers, said apparatus comprising a transport device, said transport device comprising a first transport section, a second transport section, and a conversion section, wherein said first transport section comprises a first transfer position, wherein said conversion section comprises a plurality of second transfer positions, a container holder, and a container gripper, wherein said first transport section conveys a first container stream along a first transport direction, said first container stream having a first width, wherein said second transport section conveys a second container stream along a second transport direction, said second container stream, said second container stream having a second width that differs from said first width, wherein said conversion section is disposed between said first and second transport sections, wherein said conversion section is configured to pass containers at said first transport section in a controlled manner to any one of said second transfer positions, wherein said second transfer positions are distributed along a third transport direction that extends along said conversion section, wherein said container holder is movable in a controlled manner along said third transport direction between said first transfer position and any one of said second transfer positions, wherein said gripper is configured to grip a container at said first transfer position and to carry said container along said third transport direction to any one of said second transfer positions, wherein said container holder comprises a container support that defines a container-support surface for supporting a container surface of said container, said container-support surface being defined by a subset of a cylinder, said subset consisting of all points on said cylinder that have an angular coordinate between first a first angular coordinate and a second angular coordinate that differs from said first angular coordinate, and wherein said container support is configured to swivel about an axis of said container.

19. The apparatus of claim 18, wherein said container gripper is disposed at and of a swivel arm, said swivel arm being a constituent of said container holder.

20. The apparatus of claim 18, wherein said container holder is configured to move along a velocity vector having a components directed along said first and second transport directions.

* * * * *